United States Patent [19]
Schmidt et al.

[11] Patent Number: 5,766,680
[45] Date of Patent: Jun. 16, 1998

[54] METHOD OF PRODUCING STRUCTURED INORGANIC LAYERS

[75] Inventors: Helmut Schmidt, Saarbrücken; Martin Mennig, Quierschied; Herbert Krug, Püttlingen, all of Germany

[73] Assignee: Institut für Neue Materialien Gemeinnützige GmbH, Saarbrücken, Germany

[21] Appl. No.: 737,340

[22] PCT Filed: May 16, 1995

[86] PCT No.: PCT/EP95/01844

§ 371 Date: Jan. 10, 1997

§ 102(e) Date: Jan. 10, 1997

[87] PCT Pub. No.: WO95/31413

PCT Pub. Date: Nov. 23, 1995

[30] Foreign Application Priority Data

May 18, 1994 [DE] Germany ............... 44 17 405.5

[51] Int. Cl.$^6$ ............... B05D 3/02; B05D 3/12
[52] U.S. Cl. ............... 427/226; 427/359; 427/387
[58] Field of Search ............... 427/387, 226, 427/355, 359

[56] References Cited

U.S. PATENT DOCUMENTS

| 4,243,692 | 1/1981 | Scholze et al. ............... 427/2 |
| 4,840,666 | 6/1989 | Schmidt et al. ............... 106/14.05 |

FOREIGN PATENT DOCUMENTS

| 4130550 | 3/1993 | Germany . |
| 4217432 | 12/1993 | Germany . |
| 4338360 | 5/1995 | Germany . |

OTHER PUBLICATIONS

Mater. Res. Soc. Symp. Proc. (1994), 346, 915–21, Kasemann et al.
Proc. SPIE–Int. Soc. Opt. Eng. (1994), 2288, 120–9, Mennig et al.
Riv. Stn. Sper. VETRO (1992), 22(1), 11–13, Schmidt et al.

Primary Examiner—Erma Cameron
Attorney, Agent, or Firm—Oblon, Spivak, McClelland, Maier & Neustadt, P.C.

[57] ABSTRACT

Structured inorganic layers are produced by optionally mixing a composition which is obtainable by hydrolysis and polycondensation of (A) at least one hydrolyzable silane of general formula (I)

$$SiX_4 \quad (I)$$

wherein the radicals X are identical or different and represent hydrolyzable groups or hydroxyl groups, or an oligomer derived therefrom, and (B) at least one organosilane of general formula (II)

$$R^1_a R^2_b SiX_{(4-a-b)} \quad (II)$$

wherein $R^1$ is a non-hydrolyzable group, $R^2$ represents a radical carrying a functional group, X has the meaning specified above, and a and b are 0, 1, 2 or 3, the sum (a+b) being 1, 2 or 3, or an oligomer derived therefrom, in a ratio of amount of substance (A):(B) of 5–50:50–95, as well as (C) optionally, one or more compounds of glass- or ceramic forming elements, with a fine-scaled filler, applying the resulting composition onto a substrate, structuring the applied composition and thermally densifying the structured coating to form a structured layer.

22 Claims, 1 Drawing Sheet

METHOD OF PRODUCING STRUCTURED INORGANIC LAYERS

BACKGROUND OF THE INVENTION

Field of the Invention

The invention relates to a process for producing structured, optionally functional, inorganic (glass-like, glass-ceramic or ceramic) layers on substrates.

Particularly, the invention relates to a process for producing structured inorganic layers on substrates which is characterized in that an inorganic-organic system, obtainable by hydrolysis and polycondensation of (A) at least one hydrolyzable silane of general formula (I)

wherein the radicals X are identical or different and are hydrolyzable groups or hydroxyl groups, or an oligomer derived therefrom, and (B) at least one organosilane of general formula (II)

wherein $R^1$ is a hydrolyzable radical, $R^2$ represents a radical carrying a functional group, X has the meaning specified above, and a and b have a value of 0, 1, 2 or 3, the sum (a+b) having a value of 1, 2 or 3, or an oligomer derived therefrom, in a ratio of amount of substance (A):(B) of 5–50:50–95, as well as (C) optionally, one or more compounds of glass- or ceramic-forming elements, is optionally mixed with a fine-scaled filler, the resulting composition is applied as layer onto a substrate, the applied system is structured and the structured coating is thermally densified to form a structured layer, the profile of the structure remaining unchanged.

DETAILED DESCRIPTION OF THE PREFERRED EMBODIMENTS

Figure 1:
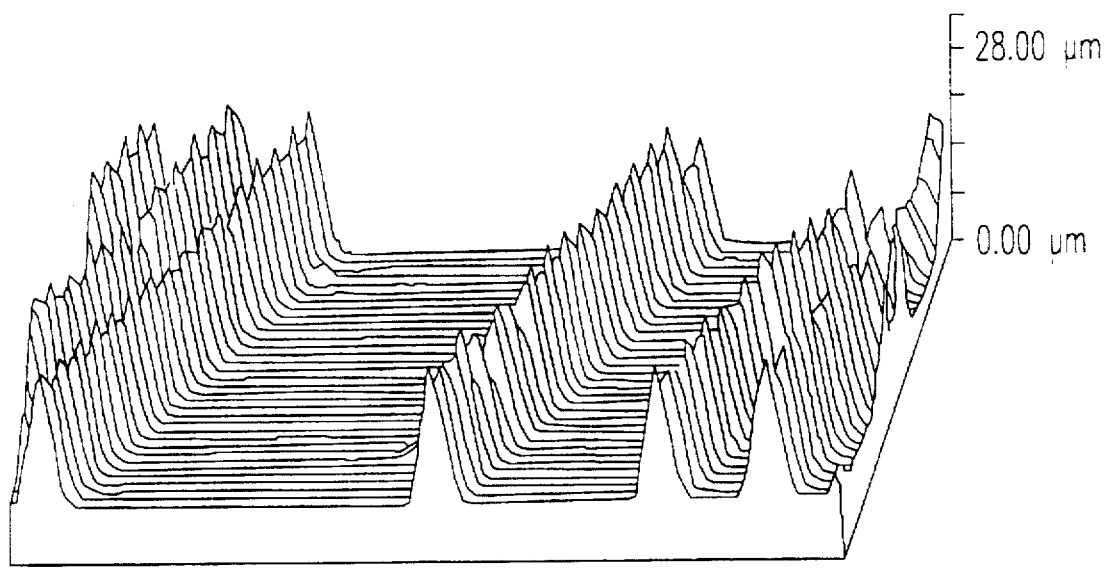
FIG. 1 depicts the land structure after drying at 80 degrees C.

The process according to the present invention is based on the surprising finding that the structured coating applied onto the substrate can be subjected to a thermal densification at high temperatures without changing the profile of the structure, despite the relatively high proportion of organic (carbon-containing) components of said coating. In the thermal densification, a continuous transformation from an organically modified glass (or ceramic, respectively) to a purely inorganic (carbon-free) $SiO_2$ glass (or ceramic, respectively) takes place.

It is already known that certain organically modified, inorganic sol-gel coatings may be converted into inorganic systems by means of a suitable thermal treatment without adversely affecting the coatings. Further, it is also known that inorganic sol-gel coatings may on principle be structured by means of embossing processes and may be transformed to inorganic, glass-like layers by thermal densification at temperatures of from 500° to 700° C. In said cases the heights of the structures may, however, not exceed a few hundred nm, and due to an extremely high shrinkage (30 to 70% by vol.), a "near net shaping" is impossible. Therefore, it is surprising that the coating systems employed according to the present invention retain a profile created in the gel state upon thermal densification. Particularly, no rounding of structured edges occurs, as it is generally known for other structuring processes for inorganic materials (e.g., screen printing with ceramic paints, hot pressing of silicate glasses or molding processes with glass powders). According to the present invention, layer thicknesses of up to about 10 μm may be realized without any problems and structure hights of the same order of magnitude may be transferred into the material, e.g., by means of embossing processes, without observing a change in the profile of the structure upon transformation into the (purely) inorganic form by thermal treatment.

Examples of the hydrolyzable groups X in the hydrolyzable silanes (A) and the organosilanes (B) are hydrogen or halogen (F, Cl, Br or I), alkoxy (preferably $C_{1-6}$ alkoxy, such as methoxy, ethoxy, n-propoxy, i-propoxy and butoxy), aryloxy (preferably $C_{6-10}$ aryloxy, such as phenoxy), acyloxy (preferably $C_{1-6}$ acyloxy, such as acetoxy or propionyloxy), alkylcarbonyl (preferably $C_{2-7}$ alkylcarbonyl, such as acetyl), amino, monoalkylamino or dialkylamino having preferably 1 to 12, particularly 1 to 6, carbon atoms.

Examples of the non-hydrolyzable radical $R^1$ are alkyl (preferably $C_{1-6}$ alkyl, such as methyl, ethyl, n-propyl, isopropyl, n-butyl, s-butyl and t-butyl, pentyl, hexyl or cyclohexyl), alkenyl (preferably $C_{2-6}$ alkenyl, such as vinyl, 1-propenyl, 2-propenyl and butenyl), alkynyl (preferably $C_{2-6}$ alkynyl, such as acetylenyl and propargyl) and aryl (preferably $C_{6-10}$ aryl, such as phenyl and naphthyl). The mentioned radicals $R^1$ and X may optionally have one or more conventional substituents, such as halogen or alkoxy.

Specific examples of the functional groups of the radical $R^2$ are the epoxy, hydroxy, ether, amino, monoalkylamino, dialkylamino, amide, carboxy, mercapto, thioether, vinyl, acryloxy, methacryloxy, cyano, halogen, aldehyde, alkylcarbonyl, sulfonic acid and phosphoric acid groups. Said functional groups are bonded to the silicon atom through alkylene, alkenylene or arylene bridging groups which may be interrupted by oxygen or sulfur atoms or —NH groups. Said bridging groups are derived, for example, from the above alkyl, alkenyl or aryl radicals. The radicals $R^2$ preferably contain 1 to 18, particularly 1 to 8, carbon atoms.

In general formula (II), a is preferably 0, 1 or 2, b is preferably 1 or 2, and the sum (a+b) is preferably 1 or 2.

Particularly preferred hydrolyzable silanes (A) are tetraalkoxysilanes, such as tetraethoxysilane (TEOS). Particularly preferred organosilanes are epoxy-silanes, such as 3-glycidyloxypropyl trimethoxysilane (GPTS) and aminosilanes, such as 3-aminopropyl triethoxysilane and 3-(aminoethylamino)propyl triethoxy-silane (DIAMO).

The ratio of amount of substance of the hydrolyzable silane (A) to the organosilane (B) is 5 to 50:50 to 95, preferably 15 to 25:75 to 85.

The optional component (C) is preferably soluble or dispersible in the reaction medium. Compounds (halides, alkoxides, carboxylates, chelates, etc.) of lithium, sodium, potassium, rubidium, cesium, beryllium, magnesium, calcium, strontium, barium, boron, aluminum, titanium, zirconium, tin, zinc or vanadium may, for example, be used. The hydrolysis and polycondensation are conducted either in the absence of a solvent or, preferably, in an aqueous or aqueous/organic reaction medium, optionally in the presence of an acidic or basic condensation catalyst, such as HCl, HNO$_3$ or NH$_3$. If a liquid reaction medium is employed the starting components are soluble in said reaction medium. Suitable organic solvents are particularly solvents which are miscible with water, e.g., mono- or polyhydric aliphatic alcohols, ethers, esters, ketones, amides, sulfoxides and sulfones.

Preferably, the hydrolysis and polycondensation are effected under the conditions of the sol-gel process, the reaction mixture being employed in the viscous sol state for the coating of the substrate.

Optionally, the hydrolysis and polycondensation are carried out in the presence of a complexing agent, e.g., nitrates, B-dicarbonyl compounds (e.g., acetylacetonates or acetoacetates), carboxylic acids (e.g., methacrylic acid) or carboxylates (e.g., acetate, citrate or glycolate), betains, diols, diamines (e.g., DIAMO) or crown ethers.

The fine-scaled filler which is optionally (and preferably) added to the reaction system may be added to the reaction system prior to, during or after the hydrolysis and condensation just described. Preferably, the addition is effected at the beginning of the sol formation, optionally following an appropriate prehydrolysis of the silanes involved.

The fine-scaled filler is preferably employed in an amount of 0 to 50% by wt., preferably 10 to 40% by wt., and particularly 20 to 30% by wt., based on the solids content of the applied composition. The addition may be effected in the form of, e.g., aqueous or alcoholic suspensions of nanoscaled particles (range of sizes 1 to 1000 nm, preferably 1 to 300 nm) having an appropriate particle size distribution.

Preferred fillers are oxides of metals and non-metals (e.g., SiO$_2$, TiO$_2$, ZrO$_2$, Al$_2$O$_3$ and Fe$_2$O$_3$, but also metal oxides such as Cr$_2$O$_3$, CuO, Cu$_2$O, ZnO, Mn$_2$O$_3$, SnO$_2$, PdO and In$_3$O$_3$), including the mixed oxides (e.g., spinels) and similar oxygen-containing (e.g., hydrated) compounds (for example, SiOOH, AlOOH) as well as carbon black.

The filler may serve several functions, for example, control of the rheology of the coating composition both during application and during structuring thereof, influencing the densification and shrinkage behavior of the material during the transformation of the structured coating into an inorganic system, and realization of particular properties, particularly optical properties (e.g., by extinction effects). The sol obtained may optionally also be mixed with at least one molecular-disperse or nanoscaled function carrier from the group of the temperature resistant dyes and pigments, coloring metal ions, metal or metal compound colloids and metal ions which form metal colloids under reducing conditions.

As temperature resistant dyes, azo dyes such as Methyl Orange, Alizarin Yellow or Kongo Red; disperse dyes such as Disperse Red; triphenylmethane dyes such as malachite green, eosin, fluorescein, aurin and phenolphthalein; vat dyes such as indigo, thioindigo and anthraquinone dyes; perylene dyes as well as fluorescent dyes such as Fluorescent Brightener 28 are suitable. Examples of utilizable pigments are phthalocyanines having e.g. Cu, Co, Ni, Zn or Cr as central atoms and carbon black pigments having a particle diameter below 500 nm.

The coloring metal ions are preferably employed in the form of water-soluble salts, such as nitrates or halides, of, e.g., Mn$^{2+}$, Co$^{2+}$, Fe$^{3+}$ or Cr$^{3+}$.

As metal colloids, particularly those of Ag, Cu, Au, Pd and Pt are suitable. Said metal colloids usually have a particle diameter of 1 to 100 nm, i.e., 1 to 20 nm in the case of transparent layers and 20 to 100 nm in the case of light-scattering layers.

Suitable metal compounds in colloidal form are, e.g., metal halides such as AgCl, AgBr, AgCl$_x$Br$_{1-x}$ and CuCl, metal carbides such as TiC and B$_4$C, metal nitrides such as BN and TiN, metal arsenides such as Cd$_3$As$_2$, metal phosphides such as Cd$_3$P$_2$, chalcogenides (sulfides, selenides, tellurides) such as AgS, CdS, HgS, PbS and ZnS; CdSe, ZnSe, CdTe; and mixed phases such as ZnSe/PbS$_2$ and CdS/PbS$_2$.

The metal compounds have a particle diameter of preferably 1 to 100 nm, particularly 1 to 50 nm, and particularly preferred 2 to 30 nm.

The amount of said function carrier depends on the desired functional characteristics of the coating, e.g., the desired color intensity or opacity.

The metal or metal compound colloid may optionally be employed in precomplexed form; in that case, the abovementioned complexing agents may be used.

The sol which has possibly been mixed with said finescaled filler and/or said function carrier is applied onto the substrate according to conventional coating methods, optionally after the viscosity thereof has been adjusted by removal or addition of a solvent. Utilizable methods are, e.g., dip coating, doctor blade coating, casting, spin coating, spraying, brushing, roll coating and plane screen printing. The thickness of the dried applied coating generally ranges from 0.1 to 10 µm, preferably 0.7 to 8 µm, and particularly 1 to 5 µm.

Suitable substrates are, e.g., those made of metals such as stainless steel, copper, brass, and aluminum; glasses such as float glass, borosilicate glass, lead glass or silica glass; and ceramics such as Al$_2$O$_3$, ZrO$_2$, SiO$_2$ mixed oxides or also enamel.

The applied composition is subsequently structured. The structuring is suitably effected in the gel state of the coating, at a point of time at which the gel layer is largely free of solvent but still viscous or fictile. During the structuring a further crosslinking and, thus stabilization of the gel takes place. Generally, no thermal activation is necessary for said step. Therefore it is, for example, possible to use embossing tools made of organic polymers. The structuring may be effected by means of common (mechanical) processes, such as by embossing with a suitable pattern (embossing die, roll, etc.) or by means of suitable printing methods (e.g., tampon printing).

After the structuring has been effected the coating is subjected to a thermal post-treatment (densification). Said post-treatment is preferably effected (after removal from the mold) at temperatures in excess of 250° C., preferably in excess of 400° C., and particularly preferred in excess of 500° C. Generally, the thermal densification is carried out in the range of from 400° to 700° C. Of course, the employable maximum temperature is also dependent on the melt or softening point of the substrate material.

The thermal densification may be carried out in air or in an inert gas such as nitrogen or argon. The thermal treatment may optionally also be carried out by IR or laser radiation. Optionally, a drying step at temperatures of, e.g., 80 to 150° C. may be carried out first.

The following examples illustrate the invention.

Example 1

Production of a SiO$_2$ Layer Structured with a Square Grit on Glass

With continuous stirring, 57 ml of Bayer-Kieselsol 300 (30%, Na-20 stabilized) and 1.4 ml of concentrated hydrochloric acid are added to a mixture of 160 ml of methyltriethoxysilane and 48 ml of tetraethoxysilane. After a reaction time of about 5 minutes the resulting sol is cooled in an ice bath and is subsequently filtered through a filter (pore width 0.2 μm).

A glass substrate is coated at room temperature in a dip coating process at a drawing speed of 4 mm/s, thereby forming a gel film having a thickness of about 3 μm. Following the drying of said gel film at room temperature for about 2 minutes the embossing by means of a square grit die (Ni Shim, period 1.4 μm, depth 1.5 μm) is carried out at room temperature for about 10 minutes at a contact pressure of about 0.3 MPa. The removal from the mold is also effected at room temperature, whereafter the structured coating is dried at 80° C. for 1 hour and is subsequently thermally densified in air. Up to a temperature of 300° C., the heating is carried out at a rate of 1 K/min, whereafter the temperature is raised up to 500° C. at 0.3 K/min and kept at this value for 1 hour. Thereafter, cooling is conducted at about 1 K/min. A glass-like transparent square grit structure of SiO$_2$ having a period of 1.4 μm and a height of about 1.2 μm is obtained.

Example 2

Production of a Groove Structure by Means of an Embossing Die Made of Plastic

Figure 2:
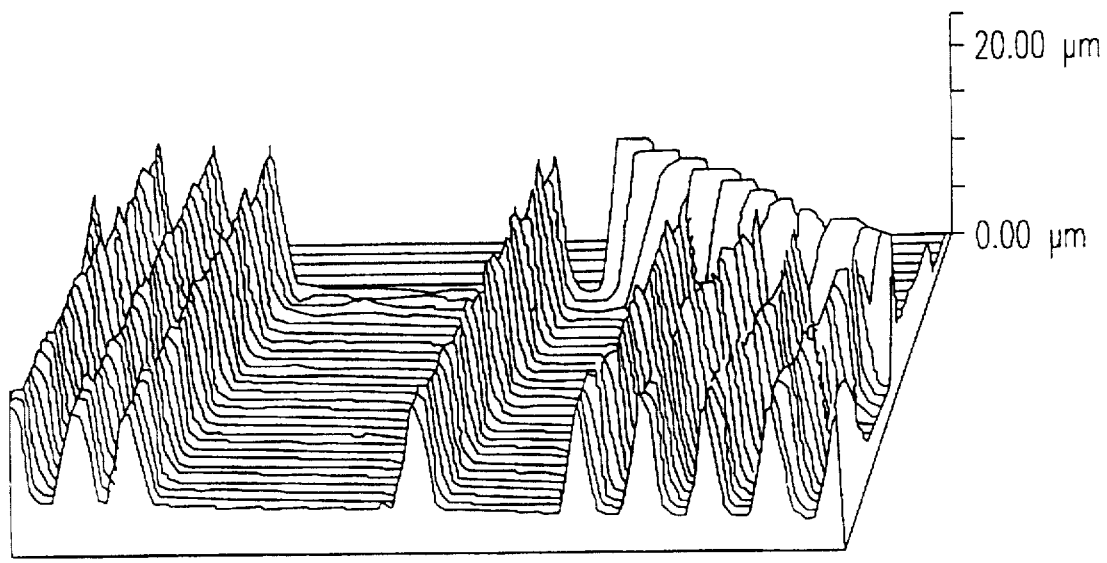
FIG. 2 depicts the land structure after densification at 500 degrees C.

A coating solution is prepared in a manner analogous to that of Example 1. A substrate made of plate glass is coated by dip coating at a drawing speed of 10 mm/s, whereby a gel film having a thickness of about 10 μm is formed. Following the drying of the coating at room temperature for 2 minutes, an embossing die having a groove structure (groove depth 10 to 12 μm) and made of plastic is pressed into the coating for 10 minutes at room temperature and at a contact pressure of about 0.2 MPa, whereafter removal from the mold is effected at room temperature. A surface treatment of the embossing die is not necessary, for the cleaning thereof an alcoholic solvent may be used. The thermal densification is carried out as in Example 1. The land structure shown in FIG. 1 (after drying at 80° C.) and FIG. 2 (after densification at 500° C.) is obtained as crack-free and optically transparent, glass-like coating. The linear shrinkage is about 10 to 20% and the height of the structure after the thermal densification is about 8 μm. The aspect ratio of the lands is completely retained. This profilometric representation evidences the surprising finding that during the transformation of the applied material into an inorganic glass the edges are not rounded, as it would be expected with all the other structuring methods for glass.

We claim:

1. Process for the production of structured inorganic layers on substrates, characterized in that a composition which is obtained by hydrolysis and polycondensation of (A) at least one hydrolyzable silane of general formula (I)

$$SiX_4 \quad (I)$$

wherein the radicals X are identical or different and represent hydrolyzable groups or hydroxyl groups, or an oligomer derived therefrom, and (B) at least one organosilane of general formula (II)

$$R^1{}_a R^2{}_b SiX_{(4-a-b)} \quad (II)$$

wherein $R^1$ is a non-hydrolyzable group, $R^2$ represents a radical carrying a functional group, X has the meaning specified above, and a and b are 0, 1, 2 or 3, the sum (a+b) being 1, 2 or 3, or an oligomer derived therefrom, in a ratio of amount of substance (A):(B) of 5–50:50–95, as well as (C) optionally, one or more compounds of glass- or ceramic-forming materials, is optionally mixed with a fine-scaled filler, the resulting composition is applied onto a substrate, the applied composition is structured and the structured coating is thermally densified to form a structured layer.

2. Process according to claim 1, characterized in that tetraalkoxysilanes are used as hydrolyzable silanes (A).

3. Process according to claim 1, characterized in that epoxysilanes or aminosilanes are used as organosilanes (B).

4. Process according to claim 1, characterized in that said hydrolysis and polycondensation are carried out under the conditions of the sol-gel process.

5. Process according to claim 1, characterized in that said hydrolysis and polycondensation are carried out in the presence of a complexing agent.

6. Process according to claim 1, characterized in that said filler is used in an amount of 0 to 50 percent by weight, based on the solids content of the applied composition.

7. Process according to claim 1, characterized in that the particle size of said filler ranges from 1 to 1000 nm.

8. Process according to claim 1, characterized in that said filler is selected from the group consisting of oxides and mixed oxides of metals and non-metals, other oxygen-containing compounds of metals and non-metals, carbon black and mixtures thereof.

9. Process according to claim 1, characterized in that said filler is selected from the group consisting of SiO$_2$, TiO$_2$, ZrO$_2$, Al$_2$O$_3$, Fe$_2$O$_3$, spinels, SiOOH, AlOOH, carbon black and mixtures thereof.

10. Process according to claim 1, characterized in that at least one function carrier selected from the group consisting of temperature resistant dyes and pigments, coloring metal ions, metal and metal compound colloids and metal ions which form metal colloids under reducing conditions is incorporated into the composition.

11. Process according to claim 10, characterized in that a temperature resistant dye selected from the group consisting of the azo dyes, disperse dyes, perylene dyes, triphenylmethane dyes, vat dyes and fluorescent dyes; or a pigment selected from the group consisting of the phthalocyanine and carbon black pigments is used as function carrier.

12. Process according to claim 10, characterized in that coloring metal ions in the form of water-soluble metal salts are used as function carrier.

13. Process according to claim 10, characterized in that nano-particles having a particle diameter of 1 to 100 nm are used as function carrier.

14. Process according to claim 10, characterized in that colloids of metals, metal halides, metal carbides, metal nitrides, metal arsenides, metal phosphides or metal chalkogenides are used as function carrier.

15. Process according to claim 1, characterized in that the substrate is selected from metal, glass or ceramic.

16. Process according to claim 1, characterized in that the composition is dried after having been applied and has a dry thickness of from 0.1 to 10 μm.

17. Process according to claim 11, characterized in that the applied coating is structured by means of an embossing die or a roll or by means of tampon printing.

18. Process according to claim 1, characterized in that the structured coating is thermally densified, optionally after a preceding drying operation, at temperatures in excess of 250° C.

19. Process according to claim 1, characterized in that said filler is used in an amount of 20 to 30 percent by weight, based on the solids content of the applied composition.

20. Process according to claim 1, characterized in that the particle size of said filler ranges from 1 to 300 nm.

21. Process according to claim 1, characterized in that the composition is dried after having been applied and has a dry thickness of from 1 to 8 µm.

22. Process according to claim 1, characterized in that the structured coating is thermally densified, optionally after a preceding drying operation, at a temperature in excess of 400° C.

* * * * *